United States Patent [19]
Kieves

[11] 3,734,548
[45] May 22, 1973

[54] SHAFT CONNECTION MECHANISM
[75] Inventor: Garry Kieves, Winnipeg 13, Manitoba, Canada
[73] Assignee: K-Tel International, Inc., Minneapolis, Minn.
[22] Filed: Dec. 20, 1971
[21] Appl. No.: 209,692

[52] U.S. Cl. ............................................. 287/53 R
[51] Int. Cl. ............................................. F16d 1/06
[58] Field of Search .................. 287/53 R, 103 A; 279/89, 90, 93

[56] References Cited
UNITED STATES PATENTS
1,424,743  8/1922  Smith .............................. 287/53 R X
1,766,136  6/1930  Markstrum ........................... 279/89
2,219,907  10/1940  Ross ................................. 287/103 A X
3,610,304  10/1971  Popeil et al. ....................... 146/113 B Primary Examiner—Andrew V. Kundrat
Attorney—Seymour Rothstein et al.

[57] ABSTRACT

Shaft connection mechanism for drivingly securing a device to a shaft in an appliance. The shaft is provided with a recessed portion adjacent an end. The end of the shaft has a non-circular configuration and the device has a non-circular opening adapted to pass over the shaft end and be retained in the recessed portion upon relative rotation between the device and the shaft. Camming means are provided in the recessed portion for drivingly engaging the device and the shaft upon relative rotation in one direction, and for effecting ready release of the device from the shaft upon rotation in an opposite direction. In a modification, the device may be non-rotatably mounted on the shaft and retained in place by a lock member having a non-circular opening adapted to passover the shaft end and be retained in a recessed portion provided with camming means.

7 Claims, 7 Drawing Figures

PATENTED MAY 22 1973 3,734,548
SHEET 1 OF 2
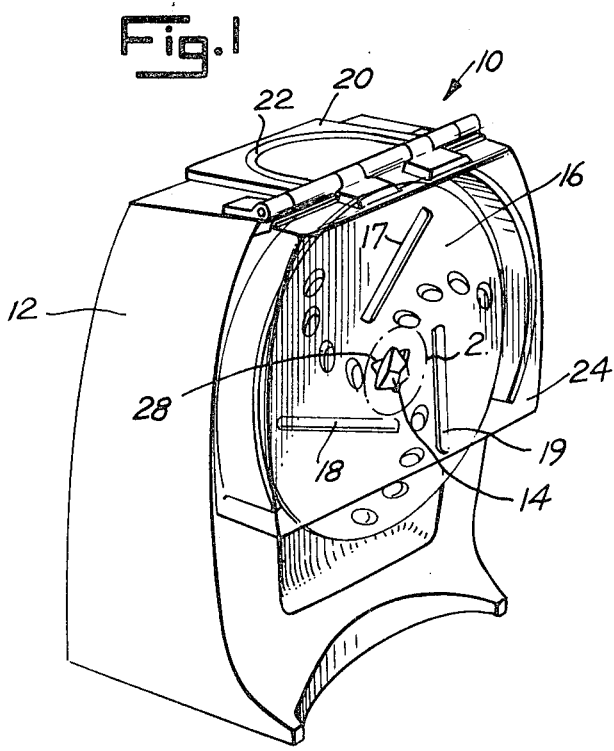
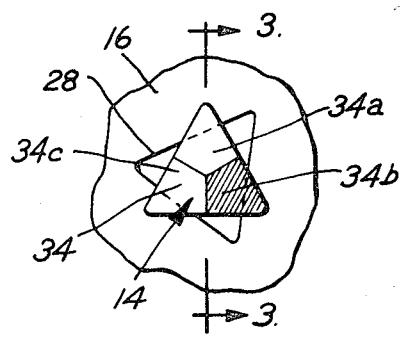
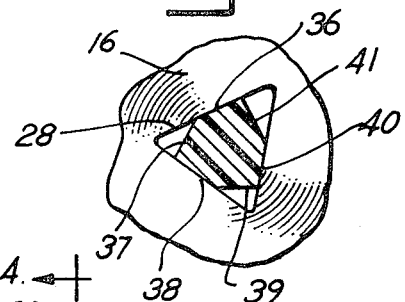
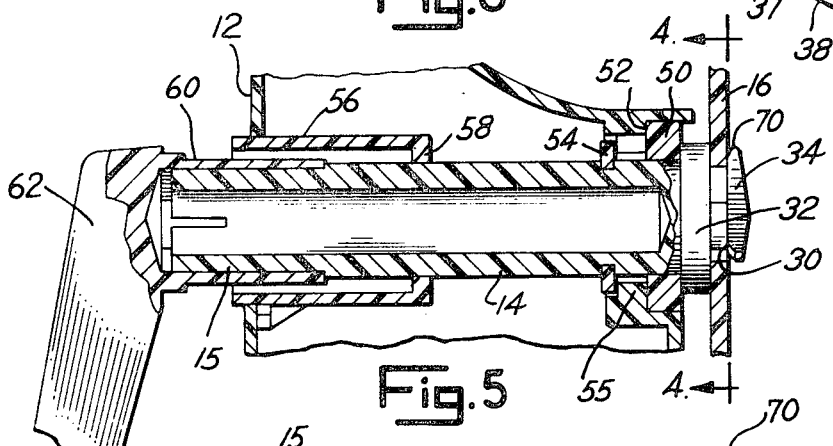
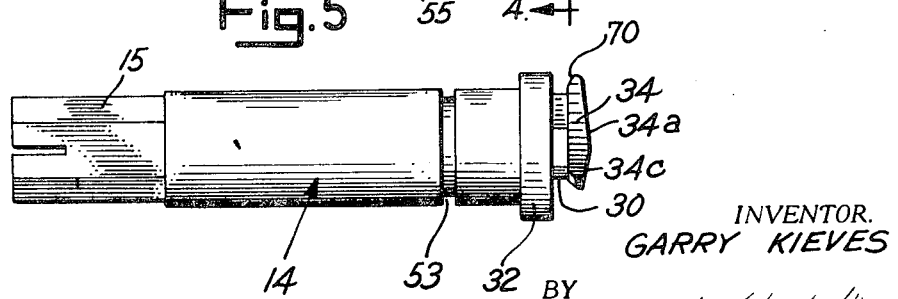
INVENTOR.
GARRY KIEVES
BY
Molinare Allegretti Nevitt & Witoff
ATTORNEYS

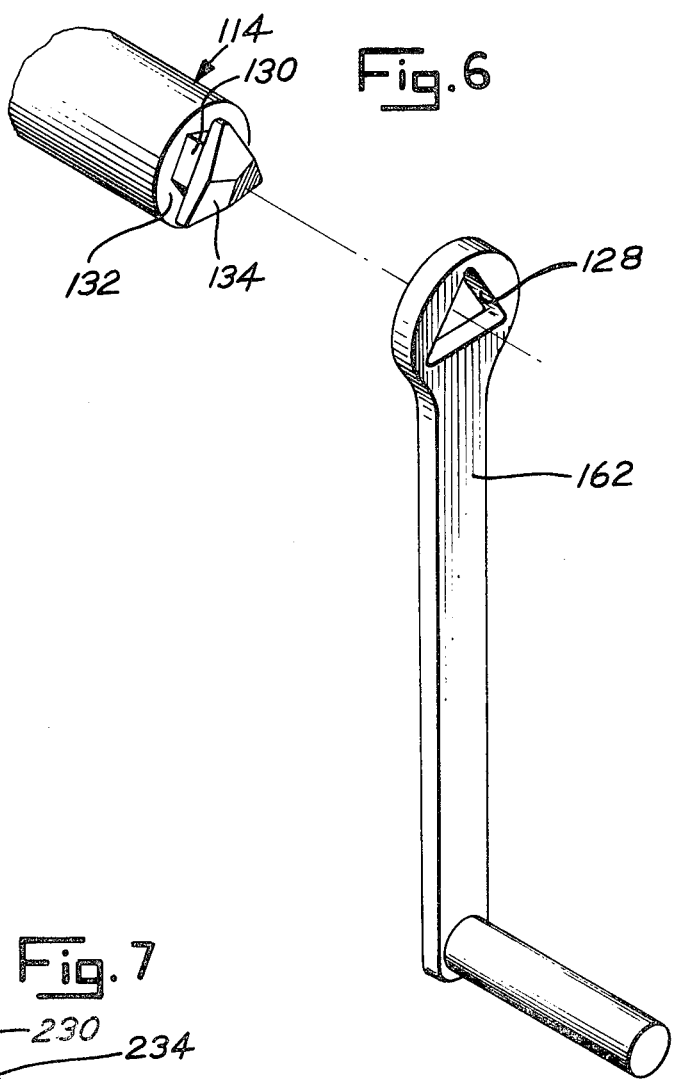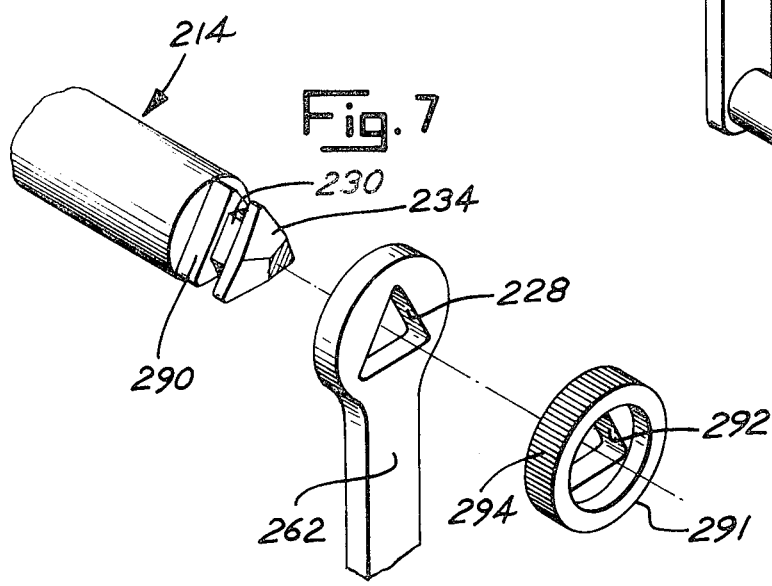

SHAFT CONNECTION MECHANISM

BACKGROUND OF THE INVENTION

The present invention relates generally to means for connecting a device to a shaft and more particularly to improved means for detachably securing a shaft to a drive means or to a driven means.

The present invention is applicable to a variety of appliances, however, for purposes of illustration, it will be described in connection with a kitchen appliance as, for example, a food shredding or cutting mechanism. One method of securing a drive shaft to a driven cutting blade in a kitchen appliance in the past has been to provide an opening in the cutting blade which engages with a threaded projection on the end of the drive shaft and securing the members to one another by means of a threaded nut. An example of this construction is shown in Anderson U.S. Pat. No. 1,339,086 and Staats U.S. Pat. No. 2,084,924. Such arrangement is cumbersome and requires threading the nut unto the end of the shaft. This can be difficult at times when food engages within the threads. Further, it poses problems in cleaning.

Subsequently, it was suggested in Moran U.S. Pat. No. 2,471,643 and Aberer U.S. Pat. No. 2,695,643, for example, that the conventional nut be replaced by a wing nut. This helped facilitate rotating the nut to affix same on the shaft end, but did not overcome the problem of waste accumulating in the threads.

Recently, in Popeil U.S. Pat. No. 3,610,304 it was suggested that a cutting blade be secured to a drive shaft by means including two L-shaped projections on the shaft end disposed about a central tapered centering pin and three openings in the cutting blade for cooperating with the projections and centering pin of the shaft. This construction was referred to as a bayonet connecting means. Bayonet connecting means for cutter blades, however, were known prior to Popeil U.S. Pat. No. 3,610,304 as shown, for example, in German Pat. No. 198,216 granted May 9, 1908.

An object of the present invention is to provide a simplified means for connecting a device to a shaft wherein the disadvantages and deficiencies of prior constructions are obviated.

Another object of the present invention is to provide an improved shaft connecting mechanism for drivingly securing a cutting device to a drive shaft in a kitchen appliance, the drive shaft having a recess portion adjacent an end and having a non-circular end configuration, and the device having a non-circular opening adapted to pass over the drive shaft and be retained in the recessed portion upon relative rotation of the device and drive shaft.

Yet another object of the present invention is to provide an improved shaft connection mechanism for drivingly engaging a rotary cutting blade to a drive shaft in a kitchen appliance, the drive shaft being provided with a recess portion adjacent the end having camming surfaces cooperating with the opening of the device which receives the shaft end.

Still another object of the present invention is to provide connection means for securing a rotatable shaft to a drive member or a driven member, the shaft having a recess portion adjacent an end provided with camming surfaces, the end of the shaft being non-circular and the member having a non-circular member adapted to pass over the shaft end and be retained in the recessed portion upon relative rotation of the member and shaft. Other objects and advantages of the present invention will become more apparent hereafter.

BRIEF DESCRIPTION OF THE DRAWING

There is shown in the attached drawing a presently preferred embodiment of the present invention wherein like numerals in the various figures refer to like elements and wherein:

FIG. 1 is a perspective view of a kitchen appliance embodying the novel connection mechanism of the present invention;

FIG. 2 is a detail side view taken generally in the area encircled by the numeral 2 on FIG. 1 illustrating the connection of the device to the shaft end;

FIG. 3 is a cross-sectional view of the kitchen appliance taken generally along line 3—3 of FIG. 2;

FIG. 4 is a detail cross-sectional view taken generally along line 4—4 of FIG. 3;

FIG. 5 is a top view of the drive shaft of the kitchen appliance illustrated in FIG. 1;

FIG. 6 is a perspective view illustrating the connection means of the present invention used to connect a drive handle to a driven shaft; and FIG. 7 is a perspective view illustrating the principles of the invention embodied in another arrangement for securing a drive handle to a driven shaft.

DETAILED DESCRIPTION OF THE PRESENT INVENTION

There is shown in FIG. 1 an appliance 10 embodying the improved connection mechanism of this invention. The appliance 10 as illustrated comprises a food cutting mechanism, however, it will be understood that the unique connection means of this invention can be applied to other appliances. The appliance 10 includes a housing 12 adapted to be suitably secured or supported on a work surface, for example a kitchen counter top. Rotatably supported within the housing 12 is a drive shaft 14 adapted to be rotated by a suitable drive mechanism as, for example, a manual handle (FIG. 3). Secured to the end of the drive shaft 14 is a device or cutting blade 16 for cutting, grating, or slicing food or the like product. The cutting blade 16 is provided with suitable cutting surfaces 17, 18 and 19 to effect desired cutting of the vegetable or like product fed into the hopper 20 at the top of the housing 12. The cover 22 is pivoted in order to permit food to be loaded into the hopper 20 and then the cover 22 is depressed in order to force the food from the rear forwardly into the area where it may be engaged by the rotating cutting blade 16. A front cover 24 is secured to the housing 12 in order to guide the sliced, shredded, chopped or grated food into a bowl or dish placed in front of the housing 12. It will be understood that the blade 16 may be provided with suitable cutting surfaces in order to effect the desired cutting of the food, that is, whether it be sliced, shredded, chopped or grated.

A feature of this invention is the improved mode of securing the cutting blade 16 to the drive shaft 14 so that it can be readily affixed and easily removed, while at the same time maintaining ease of cleanability of the components.

Turning to FIGS. 2, 3, 4 and 5, it will be noted that the cutting blade 16 is provided with a non-circular opening 28 in the center thereof. As best shown in FIGS. 2 and 4, for example, the device opening 28 is generally triangular. The end of the drive shaft 14 is provided with a recessed portion 30 which is defined between a collar-like portion 32 on the drive shaft 14 and the end portion 34 of shaft 14. The exterior wall or shaft end 34 is generally triangular in cross-section and complementary in configuration to the device opening 28, but is slightly smaller in size than the cross-section of opening 28, so that the device 16 can be readily inserted over the shaft end 34 of the shaft 14.

The recessed portion 30 includes six linear camming surfaces 36, 37, 38, 39, 40 and 41 which are adapted to cooperate with the interior linear surfaces of the device defining opening 28 in order to detachably retain the device or cutting blade 16 on the end of the drive shaft 14. The camming surfaces are generally linear and are of a preselected length such that when the device opening 28 is aligned with the triangular shaft portion 34 and placed over the recessed portion 30, relative rotation of the device 16, and the drive shaft 14 will cause the camming surfaces 36, 38 and 40 to engage with linear wall portions defining the opening 28 in order to detachably engage the cutting blade 16 for driving thereof in a given direction. It will be understood that upon reverse rotation of the device 16 relative to the drive shaft 14, the camming surfaces 36, 38 and 40 will be released from cooperative engagement with the walls defining the opening 28 and upon alignment of the opening 28 with the generally complementary shaft end 34, the device 16 can be removed from the drive shaft 14 for replacement or cleaning.

The camming surfaces 36, 38 and 40 are linear and are formed such that they are parallel with the linear wall portions defining opening 28 in device 16 when in engaged driving relationship. In addition, it can be seen in FIGS. 3 and 5 that the rear of the exterior wall or shaft end 34 is beveled, as indicated at 70, in order to help positively position and retain the device in recessed portion 30.

In FIG. 2, it is seen that the extreme end surface of the shaft end portion 34 is comprised of generally planar formed surfaces 34a, 34b and 34c. These planar surfaces are inclined relative to one another and extend rearwardly from their intersection lines so as to provide shedding surfaces to resist food adhering thereto during operation of the kitchen appliance 10.

There is better shown in FIG. 3 the manner of connecting the drive shaft 14 within the housing 12 of the kitchen appliance 10. The drive shaft 14 is adapted to be journalled proximate the front end within a bearing 50 disposed within the housing 12 and abutting an annular shoulder 52 therein. Rearwardly, a retaining ring 54 secured in annular recess 53 in the drive shaft cooperates with the side of the housing portion 55 opposite from shoulder 52 to maintain the drive shaft 14 in place. Extending forwardly from the rear wall of the housing 12 is a sleeve portion 56 which has an annular bearing ring 58 formed thereon for cooperative engagement with the exterior surface of the drive shaft 14. The rear end portion 15 of the drive shaft 14 has a non-circular external configuration adapted to cooperate with a complementary non-circular internal configuration in the sleeve connector portion 60 of the handle 62. Thus, when the handle 62 is engaged with the drive shaft 14, rotation of the handle 62 will cause rotation of the shaft 14 and the cutting blade 16 secured thereto.

In a presently preferred embodiment of the invention, the drive shaft 14 and the housing 12 are formed from a suitable plastic that can be expeditiously molded. The cutting blade 16 is preferably formed from metal, for example, stainless steel, which is readily and easily cleaned.

In FIG. 6 there is shown principles of the present invention embodied in the connection between a drive handle 162 and a driven shaft 114. The device or handle 162 is provided with a non-circular triangular opening 128 adapted to fit over the end 134 of shaft 114 and be retained in recess 130 defined between the enlarged end of shaft 114 and enlarged annular shoulder 132.

The recess 130 is provided with camming surfaces like those in recess 30 of the embodiment of FIGS. 2–5. To drivingly engage handle 162 with shaft 114, the handle opening 128 is slipped over end 134 into engagement with shoulder 132. The handle 162 is then rotated relative to the shaft 114 to drivingly engage the camming surfaces with the linear walls defining opening 128 to drive the shaft in a first direction. Reverse rotation of the handle 162 relative to shaft 114 will effect release of the handle from driving engagement with the shaft. It will be understood that shaft end 132 and the camming surfaces in recess 130 are constructed and proportioned in the same fashion as shaft end 34 and the camming surfaces in recess 30 in the embodiment of FIGS. 2–5.

FIG. 7 discloses another form of connection means embodying principles of this invention. In this case, the device is separate from the locking means and shaft. As illustrated, shaft 214 is constructed like shafts 14 and 114, except that it includes a surface 290 for receiving the opening 228 in the device, which may be a handle 262 as shown, or a cutting blade or the like. Recess 230 and shaft end 234 are constructed like the comparable parts of shafts 14 (FIGS. 2–5) and 114 (FIG. 6).

The non-circular opening 228 is complementary to the non-circular surface 290. As shown, opening 228 is triangular. Surface 290 is similarly triangular and adapted to slidingly receive the end of handle 262. The walls defining opening 228 have approximately the same width as surface 290, though preferably it is a trifle wider as will be hereafter explained.

Locking member 291 is mounted in the recess 230 after the handle 262 is positioned on surface 290. Locking member 291 has an opening 292 therein complementary in configuration to the shaft end. Opening 292 will slip over the shaft end 234. The knurled surface 294 on the locking member 291 will then be gripped by the user and rotated relative to the shaft to affix the device in place. The width of recess 230 is approximately equal to the width of the locking member 291.

The construction of FIG. 7 is particularly advantageous where the device is a cutting blade, rather than a handle as shown. The cutting blade has sharp cutting surface and may cut the hand of the user where it is necessary to rotate the cutting blade relative to the shaft to connect the two members. Use of the ancillary locking member removes the necessity of rotating the cutting blade and thereby minimizes injury to the user. Further, the annular knurled surface of the locking member 291 is lesser in diameter than the enlarged portion of the locking member, spaced from the device (or blade) and thus the hand of the user would additionally be protected from injury.

The locking member 291 is preferably molded from a suitable plastic, though it can be suitably fabricated from other materials.

There has been provided by the present invention improved connection mechanism for drivingly securing a rotatable shaft to a device. Basically, the shaft has a recessed portion adjacent an end, and the shaft end has a non-circular configuration. The device has a non-circular opening adapted to pass over the shaft end and be retained in the recessed portion upon relative rotation between the device and the drive shaft in one direction. Relative rotation in the opposite direction will permit release of the cutting blade or device from the drive shaft. The device may comprise a cutting blade or a handle, as illustrated herein. The locking means may be integral and inherent with the device or it may be comprised of a separate locking member adapted to engage in the recessed portion of a shaft, with the device engaging an adjacent non-circular surface on the shaft.

While there has been shown and described presently preferred embodiments of the invention, it will be understood that the invention is not limited thereto, since it may be otherwise embodied within the scope of the following claims.

I claim:

1. Connection mechanism for drivingly securing a device to a shaft, said shaft having a recessed portion adjacent an end, the shaft end having a non-circular configuration greater in extent than the recessed portion, locking means associated with said device for securing the same to said shaft, the locking means having an opening triangular in cross-section adapted to pass over the shaft end that is generally triangular in cross-section but somewhat smaller than the opening in the locking means and be retained in the recessed portion upon relative rotation between the locking means and shaft, the recessed portion having linear camming surfaces adapted to engage with the linear wall portions defining the triangular opening in the locking means to detachably hold the device on the shaft, the device and shaft being drivingly engaged upon relative rotation in one direction and being released upon relative rotation in the opposite direction.

2. Connection mechanism as in claim 12 wherein the linear camming surfaces are generally hexagonal in cross-section.

3. Connection mechanism as in claim 1 wherein the device comprises a cutting blade.

4. Connection mechanism as in claim 1 wherein the device comprises a handle.

5. Connection mechanism as in claim 1 wherein the locking means is integral with the device and the camming surfaces of the recessed portion are comprised of angulated linear portions offset from the sides of the triangular shaft end whereby upon positioning of the device over the recessed portion and rotation of the device and shaft relative to one another, the linear portions will be cammed into driving engagement with the device.

6. Connection mechanism as in claim 1 wherein the front of the shaft end is comprised of generally planar intersecting surfaces which extend rearwardly from the intersection lines to provide shedding surfaces that resist adherence of material thereto.

7. Connection mechanism as in claim 1 wherein the device and locking means are separate members, the device being non-rotatably disposed on the shaft and the locking means having a knurled surface to facilitate handling thereof to secure the device on the shaft.

* * * * *